April 25, 1961 C. H. HOLSCLAW 2,981,374
HAND TRUCK WITH LIFTING AND LOWERING MECHANISM
Filed Jan. 19, 1959 3 Sheets-Sheet 1
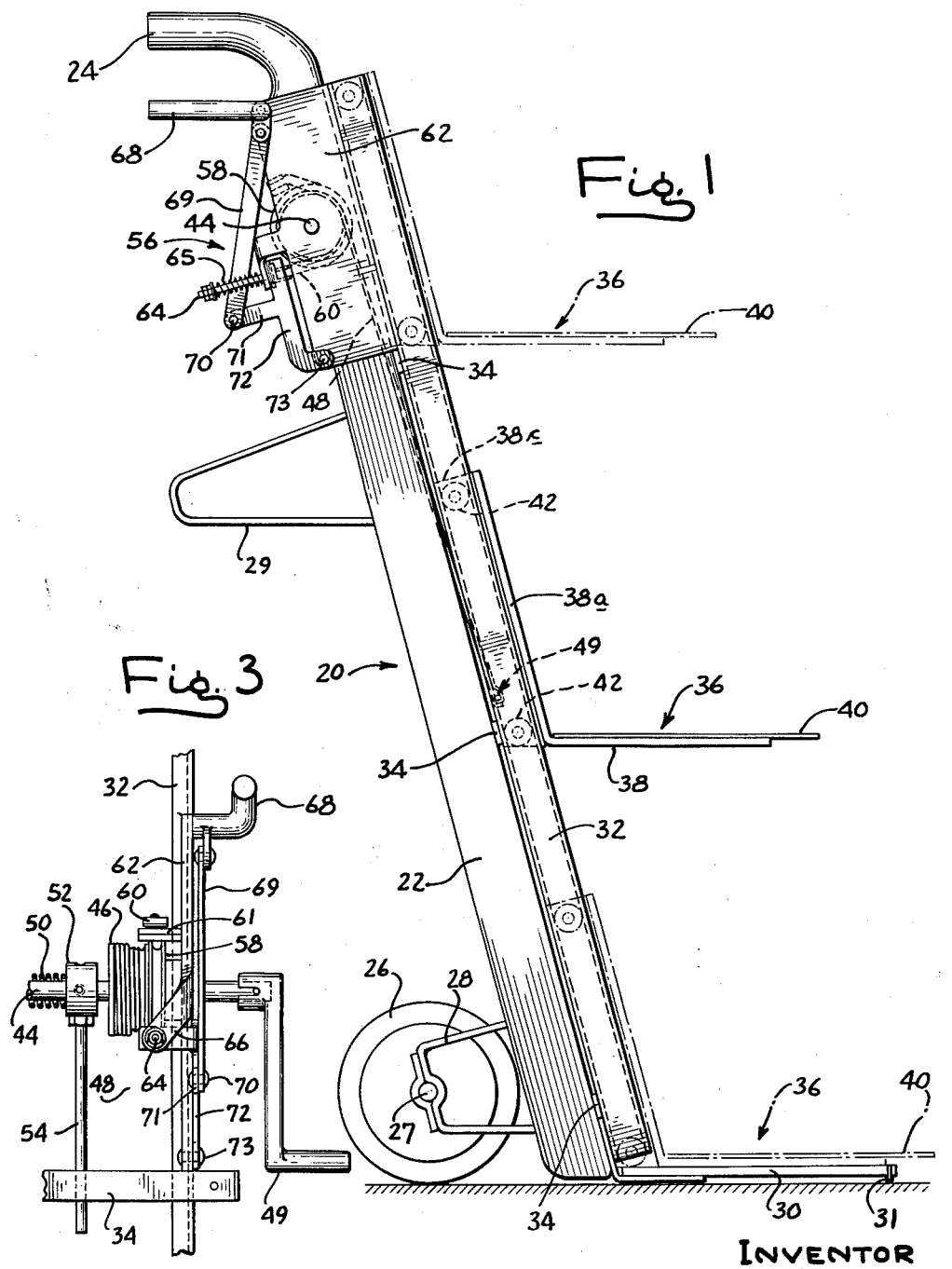
INVENTOR
CHARLES H. HOLSCLAW
by: Wolfe, Hubbard, Voit & Osann
ATTYS

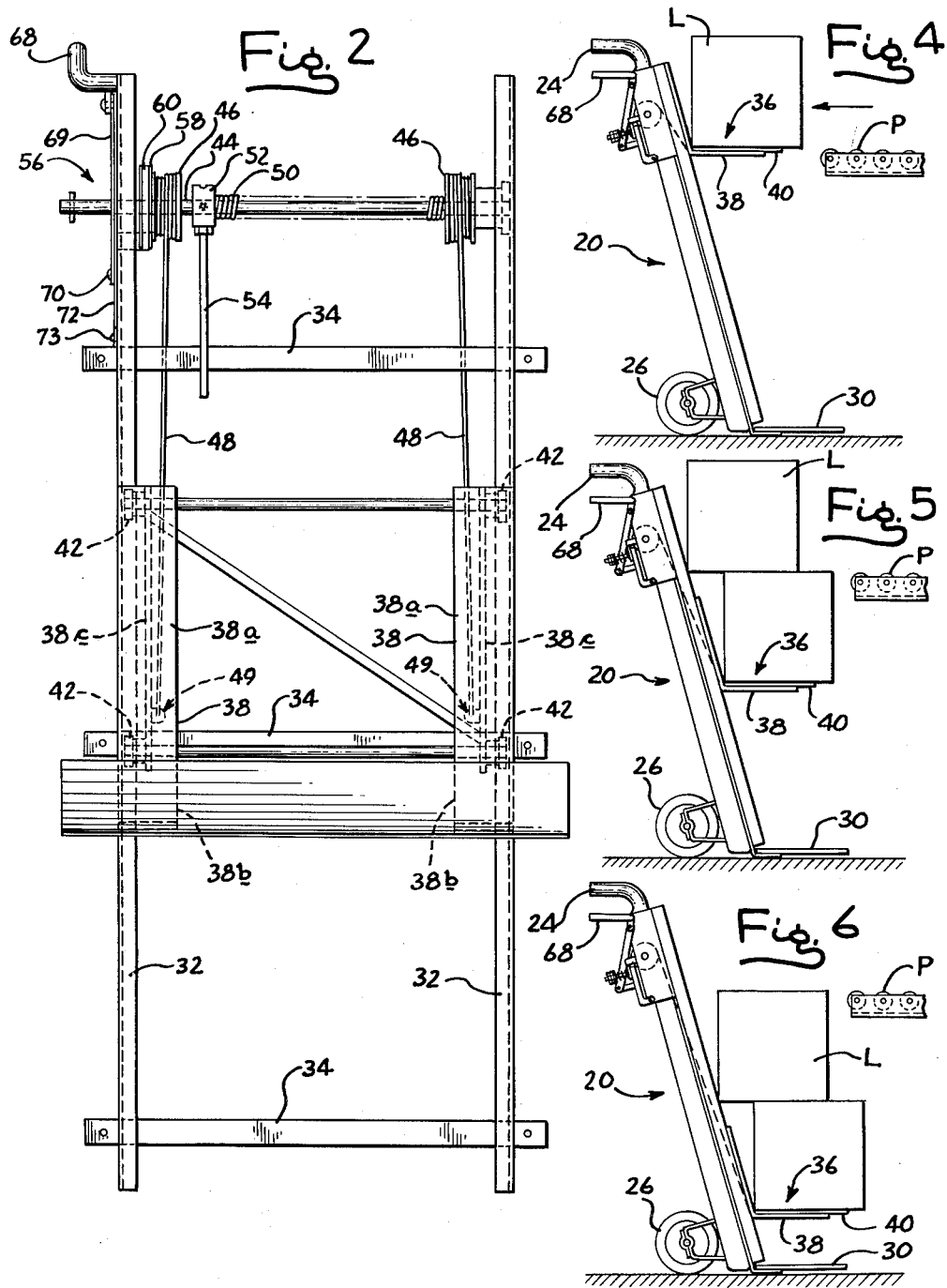

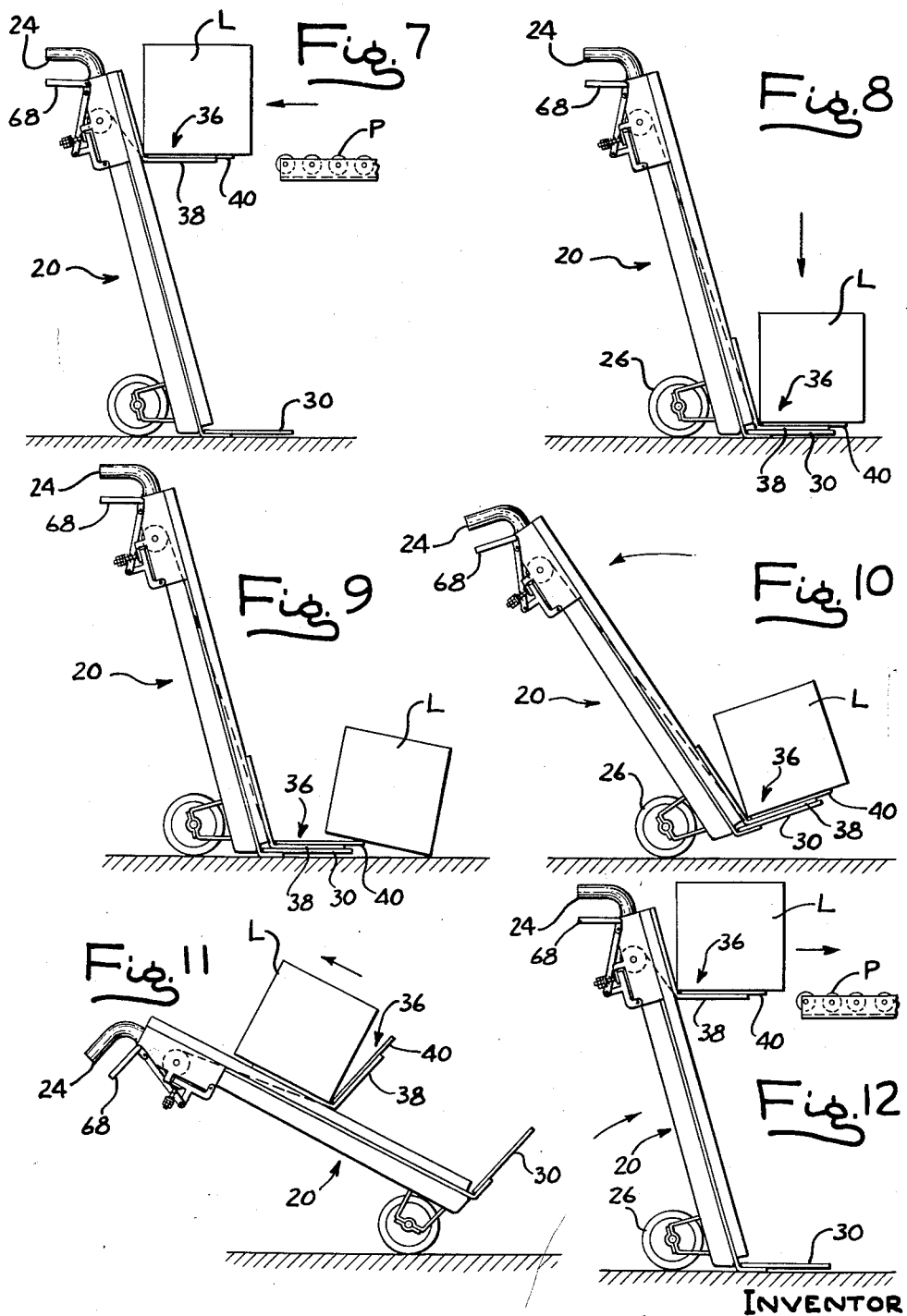

United States Patent Office 2,981,374
Patented Apr. 25, 1961

2,981,374
HAND TRUCK WITH LIFTING AND LOWERING MECHANISM

Charles H. Holsclaw, 408 N. Willow Road, Evansville, Ind.

Filed Jan. 19, 1959, Ser. No. 787,501

4 Claims. (Cl. 187—10)

The present invention relates generally to material handling devices and more particularly to such devices of the type conventionally referred to as hand trucks.

It is a general object of the invention to provide an improved hand truck with a lifting and lowering mechanism therefor which is of versatile utility and characterized by its simplicity, yet which is effective in operation, is of durable construction involving few parts, and permits of economical manufacture.

More specifically, it is an object to provide a device of the foregoing character which is adapted to receive one of a series of articles from a loading platform or the like, to utilize the weight of that article to lower it until its top is alined with the platform and in position to receive a succeeding article thereon with such step-by-step lowering continuing until the truck is fully loaded.

Yet another object is to incorporate in a hand truck lifting and lowering mechanism which is capable of moving a load engaged thereby at floor level along the truck frame for subsequent elevation into a position for discharging the load at a higher level.

The objects of the invention thus generally set forth together with other objects and ancillary advantages are attained by the construction and arrangement shown by way of illustration in the accompanying drawings, in which:

Figure 1 is a side elevation of a hand truck with a lifting and lowering mechanism and embodying the features of the present invention.

Fig. 2 is a front elevation of the lifting and lowering mechanism.

Fig. 3 is a fragmentary rear elevation of a portion of the lifting and lowering mechanism.

Figs. 4, 5 and 6 are diagrammatic side views illustrating the operation of the illustrative device in unloading a series of articles.

Figs. 7 and 8 are similar diagrammatic views to illustrate the simple unloading of a single article with controlled lowering.

Figs. 9, 10, 11 and 12 are diagrammatic views illustrating the pickup of a load at floor level and elevation thereof for unloading at a higher level.

While the invention is susceptible of modification and alternative construction there is shown in the drawings and will herein be described in considerable detail a preferred embodiment. It is to be understood, however, that it is not intended thereby to limit the invention to this specific illustrative embodiment. On the contrary it is intended to cover all modifications and alternative constructions falling within the spirit and scope of the appended claims.

Referring more particularly to the drawings there shown for purposes of illustration is a hand truck 20 embodying the features of the present invention. It includes a frame having laterally spaced side rails 22 each of which terminates at its upper end in a rearwardly projecting handle 24. At the lower end of the truck a pair of rearwardly disposed floor engaging wheels 26 are provided. As shown the wheels are journalled upon an axle 27 the outer ends of which are received in mounting brackets 28 which are fixed to the side rails 22. To support the truck in a generally horizontal position, when that is desired, each of the side rails is equipped with a leg 29. The legs 29 are spaced downwardly from the handles 24 and project rearwardly beyond the handles so as to prevent floor engagement by the outer ends of the handles.

At its lower end forwardly projecting feet 30 are fixed to the truck frame. The floor engaging feet together with the wheels 26 serve to support the truck in its normal upright position as shown in Fig. 1. Desirably, the feet are equipped at their tips with rollers 31.

The truck 20 is equipped with a lifting and lowering mechanism by means of which loads can be received in an elevated position and lowered or in a lowered position and raised. In the illustrative embodiment of the invention the lifting and lowering mechanism includes a pair of laterally spaced tracks 32. Preferably the tracks 32 are of channel shaped cross-section and are so disposed that the channels are inwardly opening. The tracks 32 are longitudinally disposed and are held in the aforesaid spaced relation by means of cross braces 34.

Mounted upon the tracks 32 is a platform generally designated 36 which is adapted to be moved along the tracks between upper or elevated and lowered or bottom positions. The platform 36 includes a pair of laterally spaced arms 38 here shown to be substantially L-shaped having generally upright portions 38a lying parallel to the plane of the tracks 32 and horizontal portions 38b projecting outwardly from the portions 38a and lying generally parallel to the truck foot 30. Interposed between the arms 38 and fixed to the arm portions 38b is a floor 40 which is adapted for receiving loads that are to be handled by the truck.

Each of the arms 38a is equipped with a pair of rollers 42. The rollers are mounted upon rearwardly extending flanges 38c which are rigid with the platform arm portions 38a along the inner edges thereof. The rollers 42 are spaced apart and are spaced rearwardly from the rear surface of the arm portions 38a for reception within the channel shaped tracks 32. Thus the rollers serve to support the platform 36 upon and guide its movement along the tracks.

The device also includes means for controlling the movement of the platform 36 along the tracks 32. As shown this means includes a transverse shaft 44 journalled adjacent its ends in the tracks 32 near the upper ends thereof. Mounted upon the shaft are a pair of cable drums 46 whcih are disposed within the tracks 32 adjacent the opposite ends of the shaft. Each of the cable drums 46 is adapted to have one end of a cable 48 affixed thereto and to receive the cable as the latter is wound thereabout. The outer ends of the cables are attached to the platform 36. Preferably attachment is effected adjacent the lower rear ends of the flanges 38c of the platform 36 as indicated at 49.

To permit manual operation for lifting a load placed upon the platform 36, the shaft 44 is extended at one end beyond the frame and is adapted to accommodate a hand crank 49.

The lifting and lowering mechanism also includes a torsion spring 50 operative to oppose shaft rotation in the direction of cable unwinding as the platform is lowered. In the illustrative embodiment this spring is of helical form and is mounted upon the shaft 44. One end of the spring 50 is fixed with respect to the shaft 44 as by fastening to one of the cable drums 46. The other end of the spring is held stationary with respect to the tracks 32. For this latter purpose and to permit adjustment of the amount of pre-tensioning of the spring, this latter end of the spring is secured to a collar 52 which is loosely mounted upon the shaft 44 so that relative rotation between the collar and the shaft can occur. The collar 52 has a plurality of circumferentially-spaced, threaded openings formed in its outer surface for the reception of pins 54 (one of which is shown in Fig. 2) by means of which the collar can be rotated with respect to the shaft 44 so as to adjust spring tension. When the desired tension is attained one of the pins 54 is located as shown in Fig. 2 in engagement with the uppermost one of the crossbars 34 so as to hold the collar against rotation by the spring.

For the purpose of controlling the rate of movement of the platform 36 along the tracks 32 the illustrative device incorporates brake means generally indicated at 56. As shown the brake means includes a brake drum 58 which for convenience may be integrally formed with one of the cable drums 46. Engaging the brake drum 58 is a brake band 60. The brake band 60 as shown is fixed at its upper end to a bracket 61 which is rigid with a mounting plate 62, the mounting plate 62 being fixed to one of the tracks 32 adjacent the upper end thereof. The brake band 60 peripherally engages the brake drum 58 and its outer end is attached to a guide rod 64 which is biased outwardly by means of a spring 65 so as to maintain the band in engagement with the drum 58. The tie rod is axially slidable in a bracket 66 which is affixed to the mounting plate 62.

To operate the brake means a toggle linkage is provided. This toggle linkage includes a hand lever 68 of bell-crank form which is pivoted upon the upper edge of the mounting plate 62 adjacent the handle 24 of the truck frame. It is thus conveniently located to be gripped by the fingers of an operator using the truck 20. To the depending arm of the lever 68 is pivoted a connecting link 69 the same being pivotally connected at 70 to a transfer link 71. The transfer link 71 is fixed to an operating lever 72. The operating lever 72 is of L-shaped configuration having its lower end pivotally attached at 73 to the lower rear corner of the mounting plate 62. The upper end of the operating lever 72 engages the brake band guide rod 64 adjacent the inner end thereof.

It will be apparent that as thus illustrated and described the brake means 56 is normally engaged. When an operator grasps the lever 68 and moves it, by ordinary gripping action, toward the handle 24 the operating lever 72 is swung in a clockwise direction as viewed in Fig. 1 by the linkage 69, 70 and 71. Thus, the guide rod 64 and the lower end of the brake band 60 are moved inwardly, against the action of the spring 65, and brake band engagement with the drum 56 is relaxed. As a result the shaft 44 is released for rotation according to the action of the spring 50 or to the weight of a load upon the platform 36 by way of the cables 48 and drums 46.

In Figs. 4, 5 and 6 there is diagrammatically illustrated one mode of intended operation of the present device. Oftentimes in day-to-day manufacturing operation a series of articles of like size and weight are required to be handled. For example, manufacturers frequently produce a series of articles which have the same weight and are packaged in uniformly sized cartons. This it will be recognized comprises conventional assembly line practice and at the end of the assembly line the packaged goods, ready for shipment, are delivered one after another by way of a conveying table or platform T, usually at standard table height. A hand truck embodying the teachings of the present invention is especially well suited for receiving such articles, and its use effectively minimizes manual handling of such articles. For such operation the torsion spring 50 of the device is appropriately pretensioned so that the weight of one such article received upon the platform 36 of the truck 20 results in movement of the platform downwardly along the tracks 32 into a position which is at a distance substantially equal to the height of the article. Thus, when the article is placed upon the platform 36, and the brake 56 is released, the platform 36 with the article in place thereon moves downwardly into a position wherein the top surface of the article is substantially alined with the table. It is stopped in this desired position by operation of the brake 56. Thus the device is conditioned to receive a second article from the table requiring only the sliding laterally of such second article from the table onto the top of the previously received article. Since the spring was prestressed to accommodate the weight of a single article the addition of a like weight of the second article, upon release of the brake means 56, causes the platform 36 to be moved further downwardly along the tracks 32 a similar distance until reapplication of the brake 56. Thus the upper surface of the second article is positioned in substantial alinement with the surface of the table P. In this new position still another article can be loaded upon the truck in the same manner simply by sliding it onto the previously loaded articles on the truck platform.

It will be apparent that unloading of such articles can be effected by simply reversing this procedure. More particularly, a loaded hand truck having its lift spring appropriately pretensioned can be brought into position adjacent a receiving table or the like, and as each article is slid onto the table from the truck, the platform is raised by the action of the spring 50 upon release of the brake means 56, to a position wherein the lower surface of the succeeding article is in subsantial alinement with the receiving table so that it can slide thereon off the hand truck to follow its predecessor.

In Figs. 7 and 8 there is diagrammatically illustrated what might be termed a simple unloading or loading operation wherein an article is unloaded from an elevated position, as from a table T, and is deposited at a lower level or is picked up from the lower level and is elevated for delivery at a higher level. In the first instance, as sequentially illustrated in Figs. 6 and 7, it is contemplated that the spring 50 of the lifting and lowering mechanism will be prestressed to yield a force upon the platform somewhat less than that of the weight of the article. When the truck is wheeled into position adjacent the table T, in this instance, the spring 50 serves to elevate the platform 36 so that its floor plate is substantially alined with the table T. Thereafter, when the article is slid from the table onto the platform, the platform is permitted to descend utilizing the weight of the article, by simply releasing the brake means 56. The rate of lowering can be controlled by judicious operation of the brake means 56 until the article is fully lowered as indicated in Fig. 8, if that should be desired.

As hereinbefore described, the shaft 44 is extended at one side laterally outward beyond the hand truck frame side rail 22 and at its outer end is adapted to accommodate a hand crank 49. Thus, if an article is received upon the truck platform 36 with the latter in lowered position, the article can be elevated by manual rotation of the shaft 44 by means of the crank 49, with the cables 48 being wound upon the drums 46 as the shaft is rotated, until the article attains a desired position such as that illustrated in Fig. 7, such operation being assisted by the action of the spring 50 upon the shaft 44.

It will be apparent that if the spring 50 is pretensioned sufficiently to exert a greater force than that resulting from the weight of the article placed upon the platform 36 when it is in a lowered position, then elevation to a desired position can be effected simply by manipulation of the brake means 56.

Figs. 9 through 12 are diagrammatic views illustrative of still another mode of operation of a hand truck incorporating the teachings of the instant invention. In these views it is contemplated that the spring 50 of the lifting and lowering mechanism is pretensioned to exert a force on the platform which is less than that resulting from the weight of the article to be handled by the truck, and yet it is desired to engage the article at floor level (Fig. 9) and position it for delivery upon the elevated table or platform P (Fig. 12). Thus, after the article is placed upon the truck platform in the manner indicated in Fig. 10, the truck is tipped rearwardly upon the wheels 26 by an operator grasping the handles of the device. It will be seen that as the truck 20 is tipped rearwardly, the angle between the floor and the rails 32 of the lifting mechanism decreases. So, too, decreases the component of force due to gravity acting upon the load, which component is in the plane of the tracks 32. This force component, it will be apparent, varies as the sine of the angle between the tracks and the horizontal, i.e., the floor. The force of the spring 50 acting along the rails 32 through the shaft 44, cable drums 46, and cables 48, upon the platform 36 remain substantially constant. So, then, at some point in its rearwardly tilting movement the force of the spring exerted upon the platform 36 along the tracks 32 will exceed that force exerted by the load in an opposite direction along the tracks. If, for example, the article has a weight of two hundred pounds and the spring force is fifty pounds, then this point would be reached when the angle between the tracks and the horizontal, i.e., the floor, became approximately 14½°. At such an angle of the tracks the fifty-pound force along the tracks deriving from the spring 50 would be slightly greater than the component of force in the opposite direction deriving from the action of gravity upon the load. As a result, and upon release of the brake means 56, the platform 36, and the load carried thereon would be moved along the rails 32 toward the handles 24. When the desired upper limit of movement along the rails 32 was reached, the operating lever 68 of the brake means 56 is released by the operator so that the load is retained in such position. Thereafter, the operator elevates the truck from the position shown in Fig. 11 into the position shown in Fig. 12 wherein the load is substantially alined with the table P, thereby permitting it to be easily slid from the truck platform 36 onto the delivery table P. It is to be noted particularly that in so doing the only lifting required by the operator is that to elevate the truck from the position shown in Fig. 11 to that shown in Fig. 12. This operation is a fulcruming movement in the manner of a second-class lever. From the standpoint of the operator it is important to note that in performing this final step he is in a physically advantageous position wherein such lifting can be accomplished with advantageous muscle utilization not likely to place any undue injury producing strain upon him.

From the foregoing it will be seen that a hand truck embodying the teachings of the present invention is particularly useful in almost any material handling application to which it might be put, and while it is simple in construction, permitting of economical manufacture, yet it is nonetheless effective. It is particularly well suited for the handling of a series of articles of similar size and weight. It permits lifting and lowering with minimum effort on the part of the operator using the device and during lifting and lowering the operator has complete control over the rate of movement with minimum effort. The device further permits an operator to engage a load at a low level and elevate it for discharge at a higher level and to do so with the operator himself assuming advantageous physical position in which he is not likely to injure himself. The incorporation upon the truck feet of tip rollers at the forward ends of the truck feet makes the instant device especially useful for moving a large bulky load into or out of a confined space, such, for example, as in the handling of a household appliance such as a refrigerator where the load is desirably moved in an upright position. The truck with the platform in its lowermost position is engaged with the load; the lift mechanism is operated to raise the load clear of the floor; and the truck is moved by the operator along the floor, the load being carried by the truck wheels and foot tip rollers.

While the invention has been illustrated and described in connection with a hand truck of a general form which is substantially conventional, it will be apparent to one skilled in the art that the teachings of the invention permit of incorporation in numerous other forms of similar devices intended for a wide variety of specialized purposes.

I claim as my invention:

1. A hand truck comprising, in combination, a frame having a pair of spaced floor engaging wheels journalled adjacent the lower end thereof and terminating at its upper end in a pair of spaced handles, a foot fixed to the frame and projecting forwardly therefrom at its lower end, a pair of laterally spaced longitudinal tracks mounted upon said frame, a platform hving a forwardly projecting floor and a pair of laterally spaced arms rigid with said floor in longitudinally projecting relation thereto, a roller journalled upon each of said arms and respectively engaging said tracks for guiding movement of said platform therealong, and means for controlling the movement of said platform along said tracks, said means including a shaft extending transversely between said tracks adjacent the upper ends thereof, a cable drum fixed to said shaft, a cable secured at one end to said platform and at the other to said drum, a torsion spring mounted upon said shaft and having one end thereof fixed with respect to said shaft, means interposed between the other end of said spring and said tracks for adjustably pretensioning said spring to oppose shaft rotation in the direction of cable unwinding, and a load brake including a brake drum fixed with respect to said shaft, a brake band engageable with said drum and means including a manually operable linkage for operating said band with respect to said drum, said spring being further tensioned as said cable is unwound from said cable drum upon movement of said platform along said tracks toward said foot under a load placed thereon when said brake means is released.

2. A hand truck comprising, in combination, a frame having a pair of spaced floor engaging wheels journalled adjacent the lower end thereof and terminating at its upper end in a pair of spaced handles, a foot fixed to the frame and projecting forwardly therefrom at its lower end, a pair of laterally spaced longitudinal tracks mounted upon said frame, a load-receiving platform haiving a forwardly projecting floor and a pair of laterally spaced arms rigid with said floor and projecting therefrom in parallel relation to said tracks, a pair of rollers journalled upon each of said arms and engaging said tracks for guiding movement of said platform therealong, a shaft extending transversely between said tracks adjacent the upper ends thereof, a cable drum fixed to said shaft, a cable secured at one end to said platform and at the other to said drum, a torsion spring adjustably pretensioned according to the load to be received upon said platform and mounted upon said shaft and having one end thereof fixed with respect to said shaft and having the other end fixed with respect to said tracks, a normally-applied brake for controlling rotation of said shaft, and manually operable means disposed adjacent one of said handles for releasing said brake, said spring being further tensioned as said cable is unwound from said cable drum upon movement of said platform along said tracks toward said foot and exerting a force by way of said shaft, drum and cable upon said platform toward said handles when said brake is released and said frame is tipped rearwardly upon said wheels to move said platform and a load received thereon along said tracks toward said handles.

3. A lifting and lowering mechanism for use with a material handling device having a generally upright frame, said mechanism comprising, in combination, a pair of tracks of channel form fixed in oppositely-disposed, parallel, spaced relation to each other and adapted to be mounted upon the frame, a transverse platform having a pair of laterally-spaced arms rigid therewith and respectively disposed in longitudinal relation adjacent said tracks, a pair of rollers journalled in spaced relation upon each of said arms and received in said tracks for moving said platform along the same, a shaft extending transversely between said tracks adjacent the upper ends thereof, a pair of cable drums fixed in spaced relation to each other upon said shaft, a pair of cables each having one end secured to said platform and the other to one of said drums for winding thereabout, a torsion spring having one end fixed with respect to said shaft, means connected with the other end of said spring for adjusting the pretensioning thereof and for retaining said other end of said spring in adjusted position with respect to said tracks, said spring being further tensioned as said cables are unwound from said cable drums upon downward movement of said platform along said tracks to apply an upward force to said platform by way of said shaft, cable drums and cables, and a normally-applied manually-releasable brake for controlling shaft rotation whereby to regulate the position of said platform and the rate of platform movement with respect to said tracks.

4. A lifting and lowering mechanism for use with a material handling device having a generally upright frame, said mechanism comprising, in combination, a pair of laterally spaced longitudinal tracks adapted to be mounted upon the frame, a platform having a pair of laterally spaced arms rigid therewith, a pair of rollers journalled upon each of said arms and engaging said tracks for guiding movement of said platform therealong, a shaft extending transversely between said tracks adjacent the upper ends thereof, a cable drum fixed to said shaft, a cable secured at one end to said platform and at the other to said drum, a torsion spring mounted upon said shaft and having one end thereof fixed with respect to said shaft, a collar having the other end of said torsion spring fixed thereto and mounted upon said shaft for independent rotation with respect thereto to effect initial adjustment of spring tension, and means for holding said collar stationary with respect to said tracks, said spring being further tensioned as said cable is unwound from said cable drum upon downward movement of said platform along said tracks under a load placed thereon.

References Cited in the file of this patent

UNITED STATES PATENTS

| | | |
|---|---|---|
| 520,043 | Fox | May 22, 1894 |
| 833,032 | Fischer | Oct. 9, 1906 |
| 1,591,719 | Merrifield | July 6, 1926 |
| 1,956,650 | Milner | May 1, 1934 |
| 2,488,461 | Wysocki | Nov. 15, 1949 |